Sept. 22, 1959     C. W. SMITH     2,905,174
ADHESIVE BANDAGE
Filed May 21, 1959     3 Sheets-Sheet 1
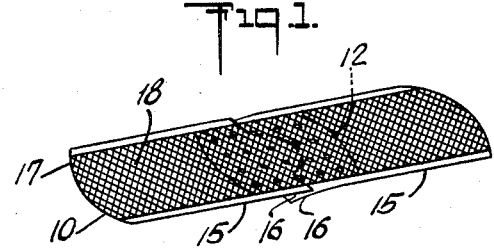
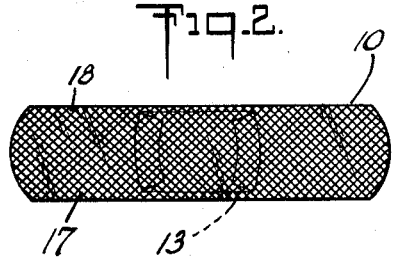 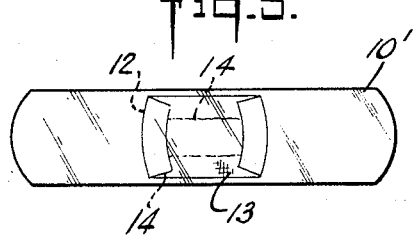
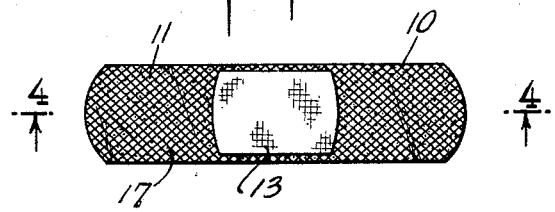
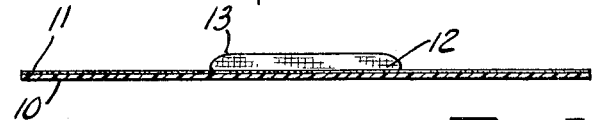
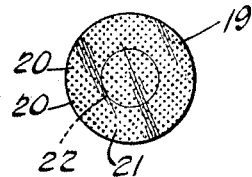 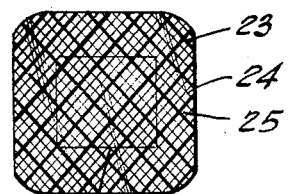
INVENTOR
Clifford W. Smith
BY
ATTORNEY

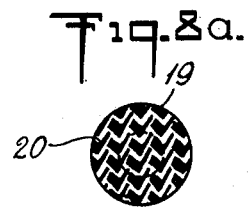
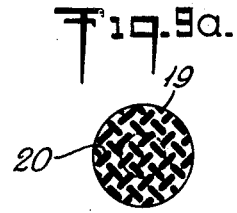
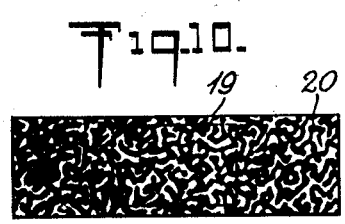
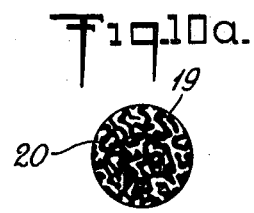
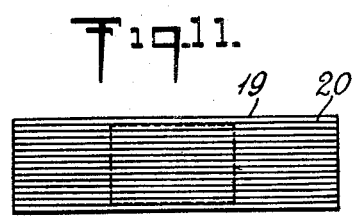
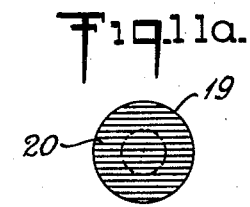
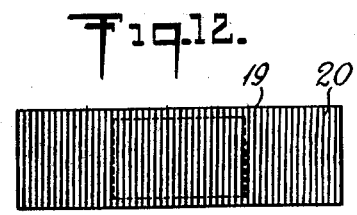
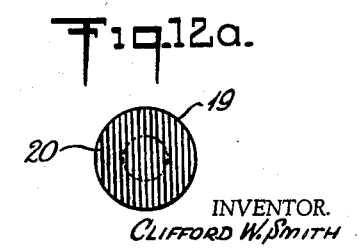

Sept. 22, 1959     C. W. SMITH     2,905,174

ADHESIVE BANDAGE

Filed May 21, 1959     3 Sheets-Sheet 3

INVENTOR.
CLIFFORD W. SMITH

United States Patent Office 2,905,174
Patented Sept. 22, 1959

2,905,174

ADHESIVE BANDAGE

Clifford W. Smith, Long Island City, N.Y., assignor to Johnson & Johnson, a corporation of New Jersey Application May 21, 1959, Serial No. 814,849

12 Claims. (Cl. 128—156)

The present invention relates to adhesive bandages and more particularly to adhesive bandages of the type wherein an absorbent dressing is carried by an adhesive-coated flexible backing. The present application is a continuation-in-part of co-pending application Serial No. 686,766, filed September 27, 1957.

Small adhesive bandages of the "spot" and "strip" type wherein an absorbent pad is carried by a flexible adhesive-coated backing have become generally accepted and are widely used for the treatment and protection of small cuts, scratches, and other superficial lesions of the skin. These bandages are worn in public and, because such superficial lesions generally occur on unprotected exposed areas, are frequently worn on areas exposed to public view, such as the hand, arm, leg, etc. It is therefore frequently desirable that the bandages be as inconspicuous as possible, except where the bandages are for small children who are anxious to display their cuts and scratches.

It has heretofore been proposed to make the flexible backing and adhesive of transparent materials so that the bandage would be less conspicuous when worn. However, bandages in which the flexible backing and adhesive were formed of transparent materials had the disadvantage that the absorbent pad was clearly visible through the transparent adhesive-coated backing.

Absorbent pads are generally formed by folding back the edges so as to avoid unraveling at the edges and to present a smooth and attractive surface. With an opaque backing, only the neat attractive face of the pad is seen. However, with a transparent backing, the unattractive back portion of the pad is clearly visible. Also, when the pad becomes soiled, for example, with wound exudate, the soiled pad is clearly visible through the transparent backing, presenting an unsightly and unattractive appearance. A further difficulty is that when the adhesive at the edge of the bandage becomes soiled in use, the soiled edge is clearly visible, adding further to the unattractive appearance of the bandage.

Even though it was initially proposed to make the backing transparent so that the bandage would be less conspicuous, the bandage was substantially less attractive when worn and, in many instances, because of its unattractiveness, was more noticeable than bandages using an opaque flexible adhesive-coated backing. As a result, even though a large proportion of the adhesive bandages presently prepared have flexible backings made of normally transparent plastics, it has been the practice to add a pigment or pigments to the plastic in order to avoid the unattractive appearance that would result if a clear, colorless transparent backing were used.

It is the object of the present invention to prepare adhesive bandages with transparent film backings in which the absorbent pad is essentially hidden from the view of any casual observer. It is a further object to prepare an adhesive bandage containing markings thereon of such a nature as to render the bandage less noticeable. It is also an object to prepare adhesive bandages which, when applied to a skin surface, will blend into the skin background.

Other objects and advantages will become apparent from the following description taken in connection with the accompanying drawings, wherein are set forth by way of illustration and example certain embodiments of this invention.

The above objects are accomplished and a bandage both attractive in appearance and substantially less noticeable, when worn, is obtained if the flexible backing and adhesive are made of transparent materials and the backing is provided with a series of flesh-colored markings so dispersed as to provide alternate, colorless and flesh-colored areas. The markings may take any shape or form. They may be in the form of spaced continuous or discontinuous lines, either intersecting or non-intersecting, in the form of dots, circles, squares, letters, check marks, or any other form which provides with the unmarked areas alternate clear and marked areas so that the surface color under the clear areas shows through the bandage and thus appears to the eye of an observer to blend with the color of the marked areas, making the bandage less conspicuous. By flesh-colored, as herein used, is meant any color simulating that of the natural skin of the wearer and generally varying from a warm pink to a tan or chocolate. A shade found to be most generally suitable is that obtained by blending iron oxide with a trace of carbon black in the following proportions:

| | Parts by weight |
|---|---|
| Rust brown iron oxide | 118 |
| Ocher iron oxide | 82 |
| Carbon black | 11 |

When the backing is made of a transparent, virtually colorless material and marked in this manner, not only is the absorbent pad screened from view but the alternate colorless and flesh-colored areas blend so well with the skin of the wearer that at a distance of a few feet it is difficult to determine any line of demarcation between the bandage and the uncovered skin. As a result, the bandage when worn is substantially less conspicuous than are bandages in which the backing is of a clear unmarked material or bandages in which the whole backing is opaque even when flesh-colored. The best results are obtained when the top surface of the flexible backing is not shiny but has a dull finish.

In practicing the present invention, it is generally preferred that the markings are of such character and so spaced that the transparent areas are approximately equal to the flesh-colored areas. However, the ratio of flesh-colored areas to clear areas in the marked pattern can vary substantially and the over-all effect of reducing conspicuousness still be obtained. The markings, however, should not be so large as to themselves become conspicuous at a few feet. It is preferred, therefore, that the markings not be much in excess of about ⅛ inch in width and not be spaced more than about ¼ inch from each other. In the preferred practice of the present invention, the flesh-colored markings consist of a series of parallel crossing lines, giving a crosshatched pattern. When the bandage is in "strip" form, the lines preferably intersect the parallel edges of the strip at an angle of about 45°. Lines of varying thickness and spacing may be used. It is generally preferred, however, not to use lines having a thickness much in excess of about ⅛ inch or spaced from each other more than about ¼ inch. Where the lines are of uniform width, uniformly spaced and crosshatched, the transparent area between the lines will be approximately equal to the flesh-colored area covered by the lines when the spacing between the parallel lines is about twice the width of the lines.

The invention is further illustrated by reference to the drawings in which:

Fig. 1 is a "strip" bandage having markings on the otherwise transparent backing in accordance with the present invention;

Fig. 2 is a top plan view of the back of the bandage of Fig. 1, the facing strips protecting the adhesive having been removed;

Fig. 3 is a view of the face of the bandage of Fig. 2, showing the absorbent pad;

Fig. 4 is a side view of the bandage of Fig. 2 somewhat enlarged;

Fig. 5 is a bandage identical to that of Figs. 1 through 4 with the exception that the markings are omitted;

Fig. 6 is a circular adhesive bandage wherein the markings are in the form of dots;

Fig. 7 is a square-shaped adhesive bandage in which the markings are made with alternate heavy and light lines; and Figs. 8–17 and 8a–17a illustrate a plurality of different types of markings on adhesive bandage "strips" and "spots."

Figure 13:
Figure 13A:
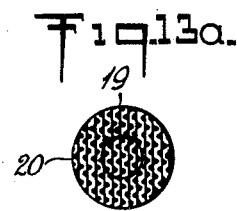

Bandages of the present invention are illustrated in Figs. 1 through 4 and 6 through 17, including the subfigures 8a through 17a. Fig. 5 is a view identical to Fig. 2 of a bandage which is the same as the bandage illustrated in Fig. 2, except for the omission of the flesh-colored markings of the present invention. Fig. 5 thus does not illustrate a bandage of the present invention but is included for the purpose of illustrating how readily visible the absorbent pad is when a transparent backing is used without the markings of the present invention.

Referring to the drawings, the adhesive bandage comprises a flexible, somewhat elastic, extensible, transparent backing 10 coated on one side with a pressure-sensitive, clear, colorless, transparent adhesive 11. The center of the bandage contains an absorbent pad 12 secured by the adhesive to the backing. The pad is formed of cotton covered with a piece of gauze 13, the edges 14 of the gauze being folded under as illustrated in Fig. 5. The pressure-sensitive adhesive is protected by facing strips 15, preferably of the type described in Gross U.S. Patent 2,703,083. The ends 16 cover and protect the face of the pad 12. When the bandage is to be used, these protective strips 15 are removed, exposing the pressure-sensitive adhesive 11.

The transparent backing 10 is provided with a plurality of flesh-colored markings. In a preferred form of the invention, these are crosshatched lines 17 spaced approximately 1/16 to 1/32 of an inch from each other as illustrated in Figs. 1, 2 and 3. The flesh-colored markings 17 together with the interposed transparent areas 18 cause the bandage, when worn, to blend with the skin of the wearer and become almost unnoticeable at a distance of a few feet. As previously stated, it has heretofore been proposed to make the flexible backing and adhesive of transparent materials to make the bandage less conspicuous. However, the difficulty with bandages of this type, as illustrated in Fig. 5, is that the absorbent pad 13 is clearly visible through the transparent backing 10'. The flesh-colored markings of the present invention, besides making the bandage blend with the background skin when worn, also hide the pad to the extent that an observer is hardly aware of the same, and any unattractive details of pad construction or soiling are completely hidden. This is well illustrated by comparing the bandages of Figs. 2 and 5.

In Figs. 6 and 7, the bandages are of the "spot" type rather than of the "strip" type, illustrated in Figs. 1 through 4. In Fig. 6, the transparent flexible backing 19 is provided with a plurality of flesh-colored dots 20 which serve the same purpose as the flesh-colored crosshatched lines 17 of Fig. 1. The area 21 between the dots is transparent. The bandage contains the conventional absorbent pad 22, hardly discernible because of the markings 20.

In Fig. 7, a somewhat different form of "spot" bandage is shown. This figure also illustrates a different marking design. The marking in this instance consists of alternate crosshatched broad lines 23 and narrow lines 24 with transparent areas 25 between. This bandage also contains the conventional absorbent pad 26, hardly noticeable because of the crosshatched lines 23 and 24.

Figure 14:
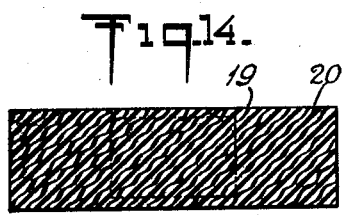
Figure 14A:
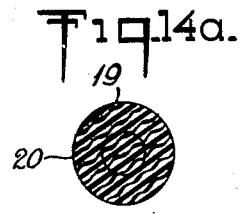
Figure 15:
Figure 15A:
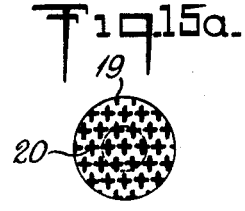
Figure 16:
Figure 16A:
Figure 17:
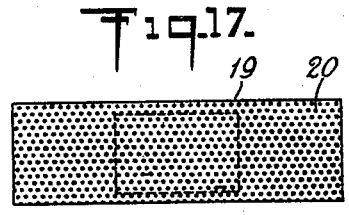
Figure 17A:
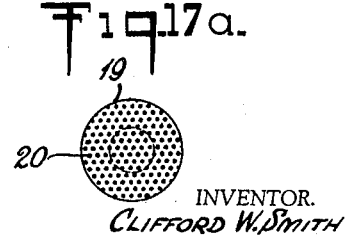

Figs. 8 through 17 illustrate a series of square-ended adhesive bandages of varying markings and Figs. 8a through 17a illustrate round "spot" bandages having corresponding markings. These figures are essentially to scale, being based on photolithographic reproductions of film backings having different types of flesh-colored markings providing alternating clear and marked areas in accordance with the present invention. Since there is some tendency in the photolithographic reproductions, particularly with markings such as illustrated in Figs. 14 and 16, for the marked areas in the reproductions to run together, the following table is given setting forth the approximate percentage of clear and marked areas as obtained by photometric measurements on the backings used in preparing the figures.

*Percent clear and marked areas of backings*
*(Figures 8–17)*

| Figure | Percent unmarked area | Percent marked area |
|---|---|---|
| 8 | 54 | 46 |
| 9 | 43 | 57 |
| 10 | 34 | 66 |
| 11 | 57 | 43 |
| 12 | 55 | 45 |
| 13 | 51 | 49 |
| 14 | 35 | 65 |
| 15 | 54 | 46 |
| 16 | 26 | 74 |
| 17 | 77 | 23 |

Although any flexible water-resistant transparent film may be used together with any water-resistant transparent pressure-sensitive adhesive, plasticized vinyl chloride films have been found to be particularly suitable. A satisfactory adhesive mass is composed of polyisobutylene and other materials, according to Wing U.S. Patent 2,484,060, in which the opaque filler has been omitted or reduced to a point where it does not overly interfere with the transparency of the mass when applied. Other transparent pressure-sensitive adhesives based on other elastomers or elastomer combinations may be used.

The opaque markings are preferably printed onto the transparent backing using a vinyl base ink. A suitable ink, for example, is a solution of vinyl acetate-vinyl chloride copolymer containing an iron oxide pigment blended with a small amount of carbon black to give the desired color shade.

The printing is preferably on the same side of the transparent backing as the adhesive mass so that the colored markings are viewed through the transparent backing when the bandage is worn. The printing should therefore be applied first and the adhesive mass then applied over the printed surface after suitable priming. Although this is the preferred form of the present invention, the invention is not limited thereto but includes modifications in which the colored markings are on the upper side.

In view of the foregoing disclosures, variations or modifications thereof will be apparent, and it is intended to include within the invention all such variations and modifications except as do not come within the scope of the appended claims.

Having thus described my invention, I claim:

1. An adhesive bandage having markings placed relative to clear areas so that the color of a surface below the clear areas appears to the eye to blend with the color of the markings to make the bandage less conspicuous when worn, said adhesive bandage comprising a flexible transparent backing, a pressure-sensitive transparent adhesive on one side of said backing, an absorbent pad carried by said backing on said adhesive-faced side, said backing having a plurality of visible flesh-colored markings providing alternate clear and flesh-colored areas, said markings in width not exceeding ⅛ inch and the distance between adjacent markings not exceeding ¼ inch.

2. An adhesive bandage of claim 1 wherein the flesh-colored markings are intermittent.

3. An adhesive bandage of claim 2 wherein the flesh-colored markings are dots.

4. An adhesive bandage of claim 1 wherein the exposed portion of the flexible backing has a dull finish.

5. An adhesive bandage of claim 4 wherein the markings are on the adhesive-containing face of the flexible backing.

6. An adhesive bandage having markings placed relative to clear areas so that the color of a surface below the clear areas appears to the eye to blend with the color of the markings to make the bandage less conspicuous when worn, said adhesive bandage comprising a flexible transparent backing, a pressure-sensitive transparent adhesive on one side of said backing, an absorbent pad carried by said backing on said adhesive-faced side, said backing having intersecting flesh-colored lines, said lines not exceeding ⅛ inch in width and the spacing between lines not exceeding ¼ inch.

7. An adhesive bandage of claim 6 wherein the intersecting lines are alternately heavy and light.

8. An adhesive bandage comprising a flexible transparent backing, a pressure-sensitive transparent adhesive on one side of said backing, an absorbent pad carried by said backing on said adhesive-faced side, said backing having a plurality of flesh-colored markings providing alternating clear and flesh-colored areas, the distance between said markings being about 1/32 to ⅛ inch and said markings being so dispersed that the transparent and flesh-colored areas are approximately equal.

9. An adhesive strip bandage comprising a flexible transparent backing, a pressure-sensitive transparent adhesive on one side of said backing, an absorbent pad carried by said backing on said adhesive-faced side, said backing containing a crosshatched pattern in a flesh-colored pigment, the flesh-colored lines forming the crosshatched pattern intersecting the longitudinal edges of the bandage at an angle of about 45°, said lines not exceeding ⅛ inch in width and the spacing between parallel lines of said crosshatched pattern not exceeding ¼ inch.

10. An adhesive bandage comprising a flexible transparent backing a pressure-sensitive transparent adhesive on one side of said backing, an absorbent pad carried by said backing on said adhesive side, said backing containing crosshatched lines in flesh-colored pigment, the lines being spaced about ⅛ to 1/32 of an inch and of such width that the transparent area between said lines is approximately equal to the area covered by said lines.

11. An adhesive bandage comprising a flexible transparent backing, a plurality of crosshatched flesh-colored lines printed on one side of said backing, a pressure-sensitive adhesive coating on said printed side, an absorbent pad carried by said backing on said adhesive-coated side, said crosshatched lines being spaced about ⅛ to 1/32 of an inch from each other and of such width that the transparent area between said lines is approximately equal to the area covered by said lines.

12. An adhesive bandage of claim 11 wherein the backing face on the side opposite the absorbent pad has a dull finish.

References Cited in the file of this patent

UNITED STATES PATENTS

| | | |
|---|---|---|
| 1,967,923 | Connolly | July 24, 1934 |
| 2,226,546 | Bower | Dec. 31, 1940 |